United States Patent [19]

Lamson

[11] Patent Number: 4,458,906
[45] Date of Patent: Jul. 10, 1984

[54] PLATFORM HAND TRUCK

[75] Inventor: Frederick W. Lamson, Birmingham, Mich.

[73] Assignee: Lockwood Manufacturing Company, Farmington, Mich.

[21] Appl. No.: 295,921

[22] Filed: Aug. 24, 1981

[51] Int. Cl.³ .............................................. B62B 3/00
[52] U.S. Cl. ............................. 280/47.34; 280/47.36; 280/79.1 R; 293/127; D34/17
[58] Field of Search ................ 280/47.34, 47.37 R, 280/79.1 R, 79.1 A, 79.3, 47.36; 293/1, 127; 296/173; D34/12, 17

[56] References Cited

U.S. PATENT DOCUMENTS

| D. 175,719 | 10/1955 | Frick | 280/79.1 R |
|---|---|---|---|
| 1,941,483 | 1/1934 | Moorman | 280/47.34 |
| 2,414,277 | 1/1947 | Shepard et al. | 280/79.1 R |
| 2,535,457 | 12/1950 | Roberts | 280/47.34 |
| 2,833,550 | 5/1958 | Frick | 280/47.34 |
| 4,055,362 | 10/1977 | Becker | 293/121 |
| 4,077,644 | 3/1978 | Roby et al. | 280/47.34 |
| 4,084,533 | 4/1978 | Boyer | 293/121 |
| 4,203,609 | 5/1980 | Mitchell et al. | 280/47.34 |

FOREIGN PATENT DOCUMENTS 2043549 10/1980 United Kingdom .......... 280/79.1 A

Primary Examiner—David M. Mitchell
Attorney, Agent, or Firm—Krass & Young

[57] ABSTRACT

A platform hand truck having a molded thermoplastic deck cover with an integrally molded bumper extending about the periphery of a metal deck. An interchangeable handle is disclosed that may be attached to either the pivot end of the turning end of the truck.

9 Claims, 6 Drawing Figures

PLATFORM HAND TRUCK

DESCRIPTION

1. Technical Field

This invention relates to platform hand trucks featuring a molded deck with an integrally formed bumper means and an inter-changeable handle that can be attached to either end of the hand truck.

2. Background Art

Conventional platform hand trucks have a load bearing deck or bed made of wood or metal. When conventional platform trucks are used in sanitary work areas, several disadvantages are encountered. Platform trucks having a wooden deck can absorb moisture, fostering bacteria growth. The wooden deck may splinter or otherwise deteriorate over an extended period of use making the platform truck unsuitable for use in a sanitary environment. Metal deck platform trucks overcome several of the disadvantages inherent in wooden deck platform trucks. The metal deck is not absorbent and will not splinter. However, a metal deck platform truck can become dented and paint may chip from the surface, detracting from the appearance and requiring repainting.

Platform hand trucks are usually provided with a handle at one end. The handle is normally permanently secured to either the swivel wheel end or the non-swivel wheel end. If the platform truck is to be used in close quarters, a shorter turning radius can be achieved by attaching the handle to the end of the truck having swivel wheels, pivotable about a vertical axis. If the platform truck is to be used for heavy objects requiring greater leverage to be exerted upon the handle, it may be advantageous to attach the handle to the non-swivel wheel end. Since the handle is permanently secured to one end, a single platform truck design is not usually acceptable for both purposes. If a manufacturer decides to offer a hand truck suited to both applications, two different designs must be made to satisfy product demand.

Platform trucks with interchangeable handles having post receptacles at each corner for receiving the ends of an inverted U-shaped handle are known. However, such a design is not well suited for use in sanitary environments because dirt and other foreign matter can build up inside the open end of the post receptacles. If an operator is careless when the handle is moved from end to end, foreign matter can be deposited on the surface of the deck.

The sides of the platform truck and end opposite the handle are usually provided with a protective bumper means, while the handle end usually does not require a bumper. The bumper is designed to protect the truck in the event of a collision with another truck or object. A rubber strip is usually attached to portions of the edge of the platform truck by means of fasteners or an adhesive. Thus, an additional step in the manufacturing process is required to add the bumper means.

Protective coatings are known to be applied to the beds of trucks to minimize the disadvantages inherent in wood and metal bed platform trucks. However, such coatings normally require constant maintenance to keep them fit for use for sanitary applications. U.S. Pat. No. 4,077,644 to ROBY was directed to solving the above problems by providing a platform truck fabricated from synthetic resin and having a removable plastic cover. While the ROBY platform truck solved the problem of providing a sanitary platform truck, it fails to provide an integrally formed bumper means for protecting the platform truck in the event of a collision. To provide a bumper for the ROBY platform truck, it would be necessary to fasten a rubber strip to the edge of the truck. In addition, the handle of the ROBY platform truck is permanently attached at one end of the truck, limiting the design to a single orientation.

DISCLOSURE OF INVENTION

The improved platform truck of the present invention has a molded polyethylene deck including an integrally molded bumper means disposed about its periphery. The bumper is molded about the entire periphery of the deck so that the handle may be switched from end to end as required.

The improved platform truck includes means for mounting the handle at either end simply, without rebuilding the truck.

It is an object of the invention to provide a platform truck with a durable, maintenance free and sanitary cover for the load bearing deck. The cover is simple to replace if it becomes damaged or worn.

Another object is to provide a bumper about the periphery of the platform truck bed that is formed in the same step and integrally with the truck bed.

A further object is to provide a platform truck with a handle mounting means at both the swivel wheel end and the non-swivel wheel end so that the handle may be attached to the truck in any desired orientation.

BEST MODE FOR CARRYING OUT THE INVENTION

Figure 1:
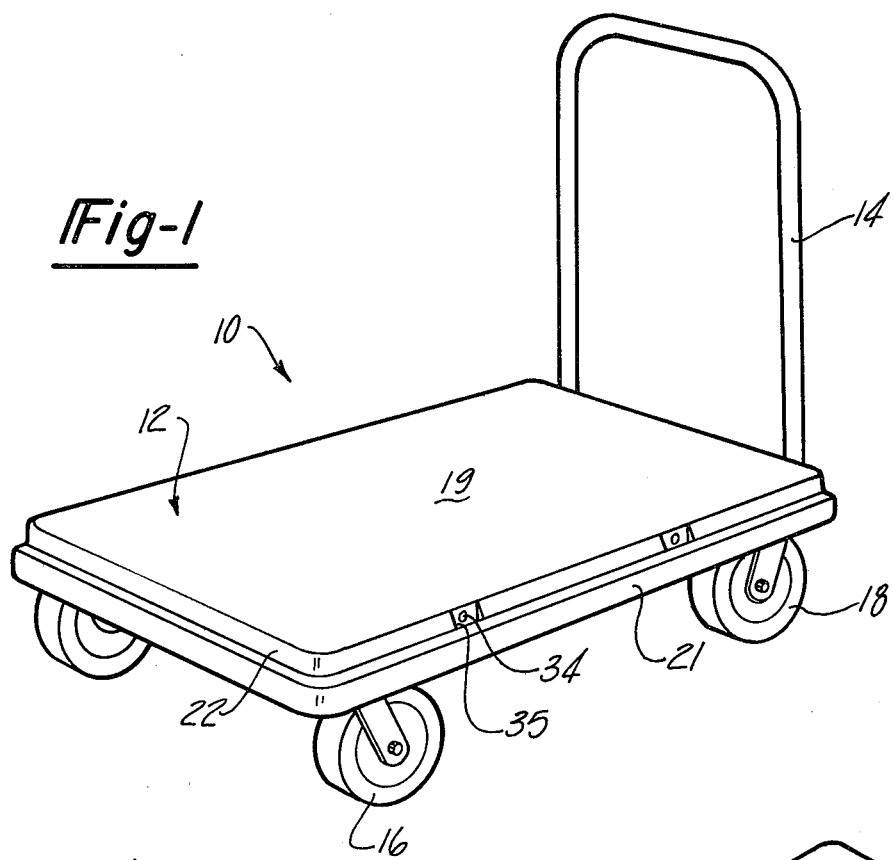
FIG. 1 is an perspective view of the platform truck according to the present invention.

Referring now to FIG. 1, platform truck 10 is shown, comprising a load bearing deck generally indicated by the number 12, a handle 14, a pair of swivel casters 16 and a pair of non-swivel casters 18. A cover 19 with an integrally molded bumper means 21 encloses the top and sides of the deck 12 to protect and preserve the deck 12.

Figure 2:
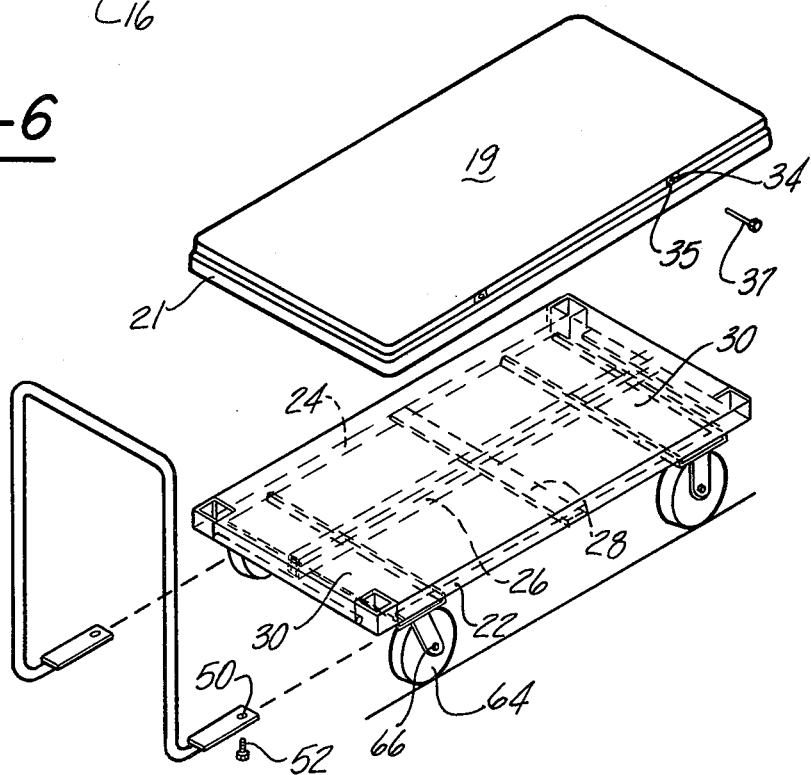
FIG. 2 is an exploded view of the platform truck.
Figure 3:
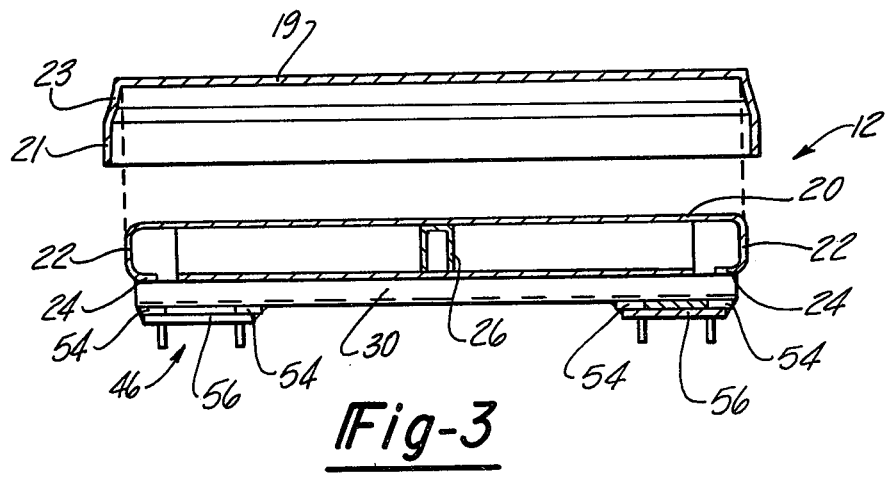
FIG. 3 is an exploded transverse cross-sectional view of the bed of the platform truck.

As shown in FIGS. 2 and 3, the deck 12 includes a metal platform 20, preferably formed from steel plate, and having depending sides 22, and an inturned rim flange 24. The platform 20 is reinforced by longitudinal channel member 26 extending lengthwise along the bottom of the platform 20. A lateral reinforcement bar 28 extends laterally across the bottom of the platform 20 and is attached to opposite rim flanges 24 on either side of the platform 20. A pair of transversely mounted caster support channels 30 are provided, one being located at either end of the platform 20. Each of the channels 30 are provided with means for attaching a caster 16 or 18 on opposite ends thereof. It should be noted that a different arrangement of casters could be provided without departing from the spirit of the invention.

Figure 6:
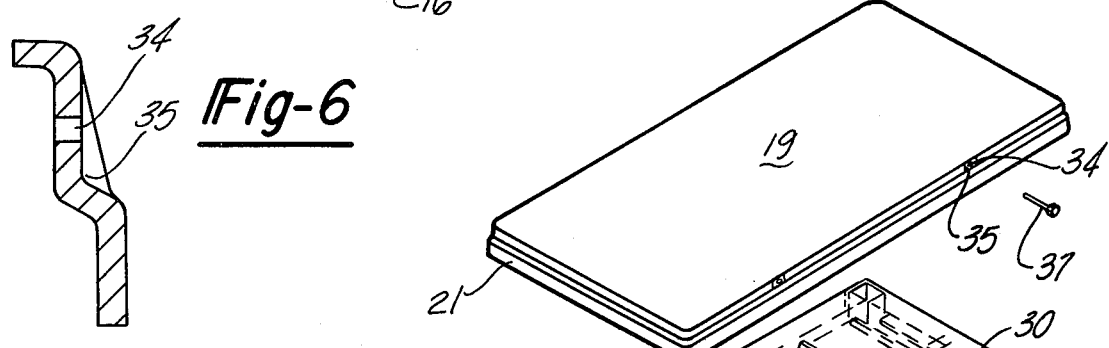
FIG. 6 is a fragmentary transverse cross-sectional view of the fastener recesses.

The cover 19 is formed in one piece of polyethylene and includes sides 23 and integrally formed bumper means 21. The cover 19 is fitted over the metal platform 20 so that the bottom surface of the cover 19 is adjacent to the top surface of the platform 20. The sides 23 are slightly flared and extend downwardly from the top of the cover 19. A plurality of recesses 35 are formed in the sides 23 of the cover 19 to engage the sides 22 of the platform 20. A hole 34 is formed in each recess 35 for receiving a fastener 37 therethrough to secure the cover 19 to the platform 20. The end of the fastener 37, being disposed within the recess 35, does not extend outwardly from the sides 23. The bumper means 21 depends from the sides 23 of the cover 19 and is flared outwardly from the sides 22 of the platform 20 to provide relief for flexing of the bumper 21 upon collision with another object. It should be noted that other bumper shapes could be integrally molded with the cover without departing from the invention. The top surface of the cover 19 may be textured or smooth depending on the intended application. The slight flaring of the sides 23 of the cover 19 facilitates removal of the cover 19 from the molding tool (not shown). As shown in FIG. 6, the recesses 35 are formed perpendicular to the top of the cover 19 to provide a firm engagement with the underlying metal platform 20. The fastener 37 can tightly secure the cover 19 to the sides 22 of the platform 20 without distorting the shape of the cover 19 and causing a weakness therein that could tear or split the cover 19 in the event of a collision.

The handle 14 is formed from metal tubing in the shape of an inverted U having two ends 43 extending perpendicularly from the ends of the U-shaped handle 14. The ends include a plate 44 for telescopic engagement with the handle attachment means 46 on the bottom of the platform truck. At the terminal end 48 of the plate 44 a threaded hole 50 is provided for receiving a fastener 52 therethrough to secure the handle 14 to the handle attachment means 46.

Figure 4:
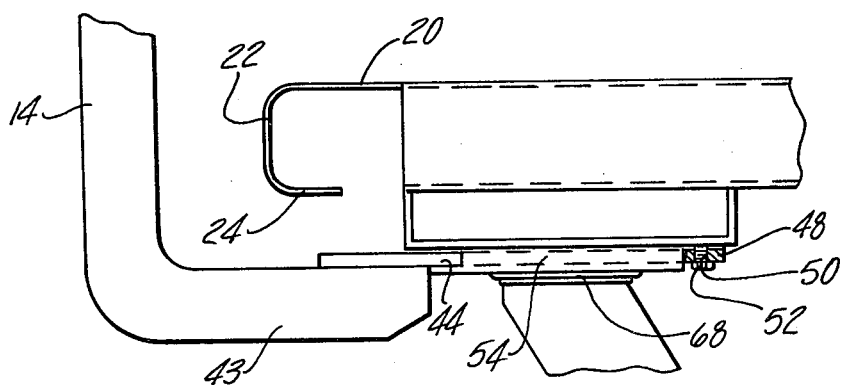
FIG. 4 is a side detail view of the handle attachment means.
Figure 5:
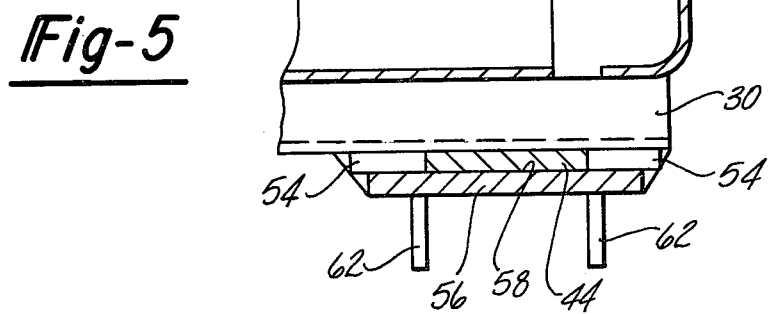
FIG. 5 is a fragmentary transverse cross-sectional view of the handle attachment means.

Handle attachment means 46 are provided on opposite ends of each caster support channel 30. As shown in FIGS. 3, 4, and 5, each handle attachment means 46 includes a pair of elongate plates 54 spaced from each other and extending in the longitudinal direction across said transverse channel 30. The bottom surface of the plates are interconnected by a caster plate 56. The opening 58 between the two plates 54, the caster plate 56 and transverse channel 30 is adapted to receive handle plate 44 therethrough when the handle 14 is secured to the attachment means 46. When the handle is attached to the truck, the threaded hole 50 is accessible on the side of the caster plate 56 opposite the handle 14, so the fastener 52 may be driven through the threaded hole 50 to bear upon the transverse channel 30 to lock the handle 14 in place. Since the handle attachment means 46 are simple and inexpensive, they can be provided at both ends of the platform truck 10. The handle 14 can be switched from end to end without having to work above the surface of the deck 12, thereby reducing the chance of contamination of the surface.

The casters 16 and 18 may be of any standard design and generally include a pair of depending arms 62 between which the wheel 64 is journalled on an axle 66. The swivel caster is mounted on the turning end of the truck 10 and includes a swivel member 68 between the arms 64 and the caster plate 56, as is well known in the art. The swivel member 68 permits the wheel 64 and arms 62 to be rotated about a vertical axis so that the turning end of the truck 10 may be displaced laterally. The non-swivel casters 18 are attached to the pivot end of the truck 10 and are stationary with respect to a vertical axis of rotation so that when the truck is turned the turning end having the swivel casters 16 pivots about the pivot end having the non-swivel casters 18.

INDUSTRIAL APPLICABILITY

The improved platform truck features a metal bed platform that is enclosed on the top and sides by a molded cover 19. The cover 19 resists deterioration and is impervious to moisture making it suitable for use in sanitary environments. The cover 19 features an outwardly and downwardly extending bumper 21 integrally formed therewith. The cover 19 is a continuous, substantially planar member having no openings in which moisture or foreign matter may collect. If the cover 19 becomes damaged or worn, it can be easily removed and replaced with a minimum of expense.

The handle 14 is designed to be attached to the bottom of the platform truck 10. The handle 14 may be secured to either the turning end or the pivot end of the platform truck 10 by means of specially adapted attachment means 46. By merely interchanging the handle 14 it is possible to provide either a front turning or rear turning platform truck. To change the handle 14 from the turning end to the pivot end only two fasteners must be removed. The handle 14 can then be withdrawn from the opening 58 formed between the caster plate 56 and transverse channel 30. The handle 14 may then be reinserted in the other end through a similar opening 58 and secured by the fastener 52.

The bumper 21 extends about the entire periphery of the deck 12, so that when the handle is switched from end to end, the platform 20 remains completely guarded on both sides and on the end opposite the handle 14.

Thus, it is apparent that there has been provided in accordance with the invention, an improved platform truck that fully satisfies the objects, aims and advantages set forth above. While the invention has been described in conjunction with a specific embodiment thereof, it is evident that many alternatives, modifications and variations will be apparent to those skilled in the art in light of the foregoing description. Accordingly, it is intended to embrace all such alternatives, modifications, and variations as fall within the spirit and scope of the appended claims.

I claim:

1. An improved platform truck of the type including a planar load bearing deck having a subtantially flat top and vertical side edges, a plurality of wheels depending from the bottom of the load bearing deck and a handle means extending upwardly from one end of said load bearing deck for exerting a motive force upon said platform truck wherein the improvement comprises:

a cover overlyingly attached to the load bearing deck including an integrally formed resilient bumper portion having a free bottom edge which is laterally flared outwardly from a peripheral edge of the cover in spaced relation to the vertical edges of said deck and extending downwardly from said top surface; and means for securing said cover to said load bearing deck.

2. The platform truck of claim 1 wherein said cover comprises a first fully-surrounding peripheral surface which overlies the peripheral side edges of the deck in the operative arrangement, said bumper portion comprising a second fully-surrounding peripheral surface having a free bottom edge and which is laterally outwardly flared from the first peripheral surface to provide a resilient bumper action, said first and second peripheral surfaces being integrally joined.

3. The platform truck of claim 1 wherein said deck cover is formed from polyethylene.

4. The platform truck of claim 1 wherein said handle means is adapted to be telescopically received by an attachment means disposed on bottom of said load bearing member at one end thereof.

5. The platform truck of claim 4 wherein a second attachment means is provided on the bottom of said load bearing member at the other end thereof, wherein said handle means is adapted to engage the attachment means at either end of the load bearing member.

6. The platform truck of claim 2 wherein open recesses are formed in the first peripheral surface of the cover perpendicular to the top thereof to firmly engage the side of said load bearing member, each recess having an opening formed therein for receiving a fastener therethrough.

7. An improved platform hand truck of the type including an elongate planar load bearing member having a turning end and a pivot end, a plurality of casters depending from the bottom of the load bearing member, a first pair of said casters being rotatable about a vertical axis and attached in spaced relationship to said turning end, and a second pair of casters being non-rotatable about a vertical axis and attached to said pivot end in spaced relationship wherein the improvement comprises:

a handle having first and second aubstantially horizontally extending ends in spaced relationship to one another corresponding to the spaced relationship of said first pair of casters and said second pair of casters;

means attached to the bottom of said load bearing member adjacent said first pair of casters for securing the handle ends to said load bearing member;

means attached to the bottom of said load bearing member adjacent said second pair of casters for securing the handle ends to said load bearing member;

first and second fasteners attached to first and second ends respectively and being adapted to releasably lock said handle to said means for securing the handle ends, whereby said handle may be alternatively attached to said turning end or said pivot end;

a plastic cover disposed over said planar load bearing member and having an integrally formed bumper around the periphery thereof in free, outwardly spaced relationship to said load bearing member, said cover having first and second sides depending from peripheral edges thereof and on opposite sides thereof between and interconnecting the cover and bumper, said first and second sides being flared slightly outwardly from said edges and having a plurality of recesses formed at spaced intervals and including a hole formed therein, said hole being adapted to receive a fastener therethrough for securing the cover to said load bearing member.

8. The platform truck of claim 7 wherein said bumper is disposed about the entire periphery of said load bearing member.

9. The platform truck of claim 7 wherein said recesses are disposed perpendicular to said planar load bearing member.

* * * * *